J. RIVIERE.
TURNING MECHANISM FOR MOTOR VEHICLES.
APPLICATION FILED FEB. 14, 1918.
1,335,856.
Patented Apr. 6, 1920.
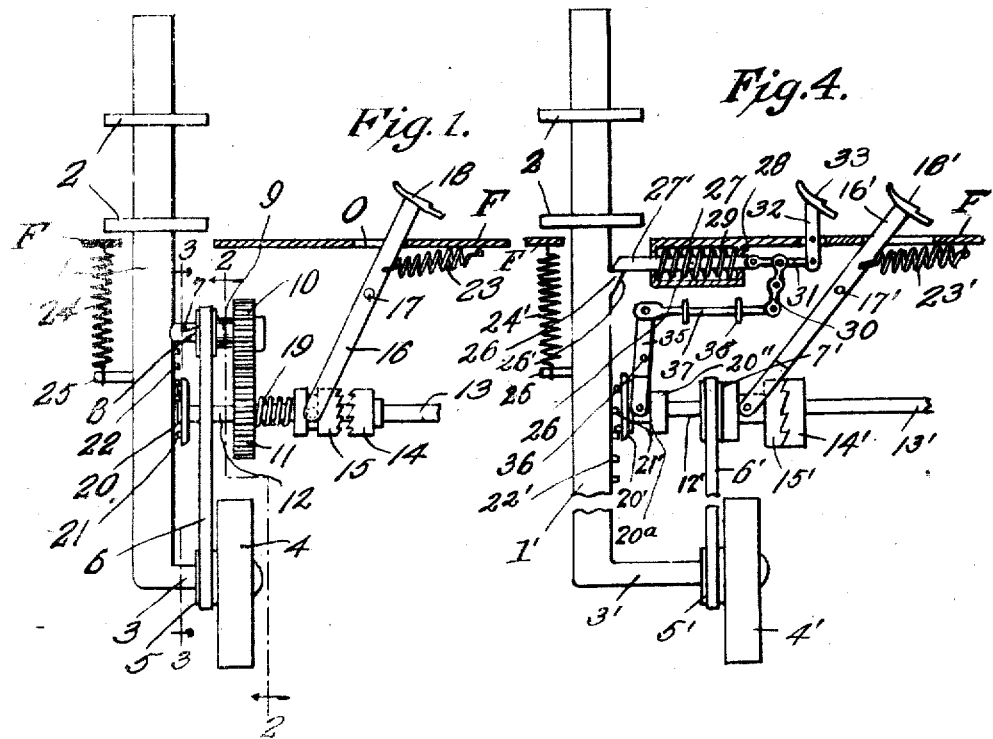
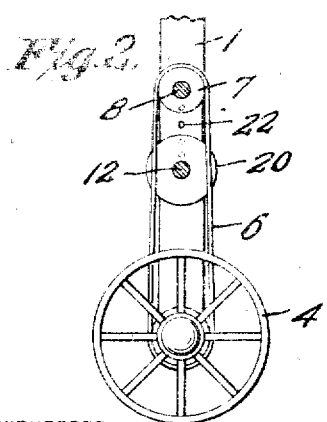
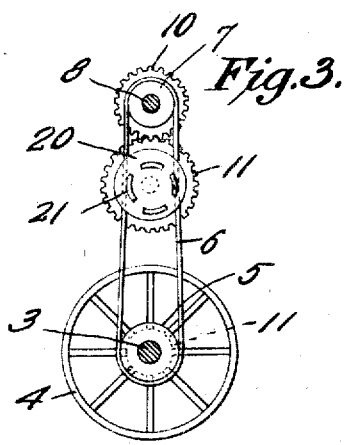
WITNESSES
James F. Crown,
L. M. McColl,
INVENTOR
Jean Riviere,
BY Richard Bowen,
ATTORNEY

UNITED STATES PATENT OFFICE.

JEAN RIVIERE, OF NEW YORK, N. Y.

TURNING MECHANISM FOR MOTOR-VEHICLES.

1,335,856.  Specification of Letters Patent.  Patented Apr. 6, 1920.

Application filed February 14, 1918. Serial No. 217,122.

*To all whom it may concern:*

Be it known that I, JEAN RIVIERE, a citizen of France, but having declared my intention of becoming a citizen of the United States, residing at New York city, in the county of New York and State of New York, have invented certain new and useful Improvements in Turning Mechanism for Motor-Vehicles, of which the following is a specification.

This invention relates to turning mechanism for automobiles and other motor vehicles.

An object of the invention is to provide a motor vehicle with mechanism whereby it may be turned in a space substantially equal to its own length, thereby permitting the vehicle to be extricated from between two other vehicles arranged in close proximity to the front and rear thereof without molesting the other vehicles, or it may be employed for making short turns in other limited spaces.

Another object is to provide such mechanism nism so constructed that the ordinary front steering wheels of the vehicle will be lifted entirely from the ground during the turning operation, and the rear wheels used as a pivot for the turning of the vehicle.

With the foregoing and other objects in view, which will appear as the description preceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of this improved turning mechanism with the floor of the vehicle to which it is applied shown in section.

Fig. 2 is a transverse vertical section taken on the line 2—2 of Fig. 1, looking in the direction of the arrows, and Fig. 3 is a similar view in section taken on the line 3—3 of Fig 1.

Fig. 4 is a side elevation showing another form of the invention.

In the embodiment illustrated in Figs. 1 to 3, the turning mechanism constituting this invention is mounted between the front wheels of the vehicle, and comprises a post 1 mounted for vertical movement between vertically spaced guides 2 carried by the vehicle to which the mechanism is to be applied. This post 1 has a laterally and rearwardly extending arm 3 on which is mounted to rotate a wheel 4 having a pulley 5 fixedly connected with the inner end of the hub thereof, being preferably made integral therewith. A driving belt 6 extends around the pulley 5 and over another pulley 7 rotatably mounted on an arm 8 which extends laterally and rearwardly from the post 1 some distance above arm 3, said arm 8 being here shown positioned just below the floor F of the vehicle. The pulley 7 is fixed to the hub 9 of a gear wheel 10 so that they rotate simultaneously. This gear wheel 10 is designed to mesh with another gear 11 carried by a shaft section 12 which is arranged in longitudinal alinement with a driving shaft 13 of the vehicle and is designed to be connected therewith for rotation by means of a clutch, one member 14 of which is fixed to shaft 13 and the other member 15 is keyed to slide on the shaft section 12. A lever 16 fulcrumed at 17 on the vehicle to which the mechanism is applied, has one end engaged with the clutch member 15 in the usual manner and its other end projects upwardly through an opening O in the floor F of the vehicle and is provided with a pedal 18 disposed in convenient position for actuation by the driver.

A coiled pull spring 19 is mounted on shaft section 12 between the inner face of the gear 11 and the front face of the clutch member 15, and exerts its tension to normally retract said clutch member and hold it out of engagement with its coöperating member 14.

Secured to the front end of the shaft section 12 is a disk 20 provided with a plurality of spirally disposed teeth 21 which are designed to mesh with teeth 22 carried by the rear face of the post 1 as is shown clearly in Figs. 1 and 2.

In the operation of this mechanism when it is desired to turn the vehicle to which it is applied in a very close space, the driver presses forward on the pedal 18 thereby rocking lever 16 to move the clutch member 15 with which it is connected, rearwardly to cause it to interlock with its coöperating member 14, this movement of the lever being acomplished against the tension of a coiled spring 23 which normally holds the lever in inoperative position as is shown clearly in Fig. 1. When these clutch members 14 and 15 are brought into engagement, the rotation of the driving shaft 13 will be imparted to the shaft section 12 and through the toothed disk 20 will operate to forcibly lower the post 1 and thereby bring the wheel 4 into engagement with the ground or surface on which the car is standing and jack up the front end of the car, lifting the ordinary steering wheels thereof, not here shown, entirely out of contact with their supporting surface. When this occurs the continued rotation of the driving shaft 13 will operate through the transversely disposed wheel 4 to turn the car with the rear wheels thereof operating as pivots so that the vehicle may be swung around on said wheels within a space substantially equal to the length thereof. This is very desirable in many instances, especially when the car is parked and other cars have been positioned in close proximity to the front and rear ends thereof, thus compelling the driver to extricate his car without moving those adjacent to it. While this device is designed primarily for effecting such extrication, it obviously may be used for turning a car in limited spaces under other conditions.

After the car has been turned, the driver removes his foot from the pedal 18 and the post 1 is automatically raised into inoperative position by means of a coiled spring 24 connected at one end to the floor F of the vehicle and at its other end to a laterally extending arm 25 carried by said post.

This mechanism is very simple in construction and may be readily applied to cars already in use, or to those during the process of manufacture.

In the embodiment shown in Fig. 4, which is the preferred form of the invention, the post 1' is mounted for vertical movement in the same manner that the post 1 of the other figures is, and has the rearwardly extending arm 3' on which is mounted to rotate a wheel 4' having a pulley 5' fixedly connected with the inner end of its hub. The driving belt 6' connects pulley 5' with another pulley 7' which is fixed to a shaft section 12' and adapted to be rotated therewith. The shaft section 12' is arranged in longitudinal alinement with the driving shaft 13' of the vehicle and is designed to be connected therewith for rotation in the same manner that these members are connected as shown in the other figures, a clutch being provided for this purpose. One member 14' of the clutch is fixed to the shaft 13' and the other member 15' is keyed to slide on the shaft section 12'. A lever 16' fulcrumed at 17' on the vehicle to which the mechanism is applied has one end engaged with the clutch member 15' in the usual manner and its other end projects upwardly through the opening in the floor F of the vehicle and is provided with a pedal 18' disposed in convenient position for actuation by the driver.

Secured to the front end of the shaft section 12' is a disk or wheel 20' provided with a plurality of spirally disposed teeth 21' which are designed to mesh with teeth 22' carried by the rear face of the post 1'.

The rear face of this disk 20' has a hub 20'' provided with an annular groove 20ª with which is engaged one end of a lever 35. This lever 35 is fulcrumed to the machine as shown at 36 and is connected at its other end with a link or bar 37 mounted to move longitudinally in guides 38. This bar 37 is connected to be operated by a lever 30 presently to be more fully described.

The post 1' has a laterally extending lug 26 on its rear face near its upper end, said lug being beveled on its outer face as shown at 26'. This lug 26 is in the form of a tooth and is designed for interlocking engagement by the beveled end 27' of a spring pressed bolt 27 which is mounted to slide in a plane at right angles to that of the post 1' and when engaged with the lug 26 locks said post in lowered operative position.

The bolt 27 is mounted to move longitudinally in a suitable housing 28 and has a coiled spring 29 wound therearound and which exerts its tension to normally project the beveled end 27' of the bolt into the path of the lug 26. The rod 31 is fixed to the rear end of the bolt 27 and is connected at its opposite end with a lever 32 fulcrumed in an opening in the floor F of the vehicle. A pedal 33 is fixed to the outer end of the lever 32 and is positioned conveniently for operation by the driver of the vehicle, and when said pedal is moved forwardly the lever is rocked on its fulcrum and its lower end moved rearwardly thereby withdrawing the bolt 27 against the tension of its spring 29, moving its beveled end entirely out of the path of the lug 26 carried by the post 1' so that said post is free to move upwardly for a purpose presently to be described.

The lever 30 which has one end connected with the bar 37 is connected at its other end with a rod 31 between the ends of said rod so that when the pedal 33 is moved forwardly to retract the bolt 27, the disk 20' is simultaneously moved rearwardly to disengage the teeth 21' thereof from the teeth 22' of the post, so that the post will move freely upward under the tension of a spring 24' which is connected in a manner similar to that numbered 24 shown in Fig. 1. It will be obvious that the forward movement of pedal 33 will move its lower end rearwardly thereby moving rod 31 rearwardly and the end of the lever 30 connected therewith in the same direction. This movement projects the lower end of lever 30 carrying with it the bar 37. This forward movement of bar 37 causes the lever 35 to rock on its fulcrum moving its upper end forward and its lower end rearwardly and thereby moving the wheel or disk 20' rearwardly to cause the disengagement of its teeth 21' from those 22' on the post 1'.

In the operation of this form of the invention, when it is desired to turn the vehicle to which it is applied in a very close space, the driver depresses the pedal 18' thereby rocking lever 16' to move the clutch member 15' rearwardly and cause its interlocking engagement with the member 14' on the driving shaft 13'. When these members are brought into engagement, the rotation of the driving shaft 13' will be imparted to the shaft section 12' and through the toothed disk or wheel 20' will operate to forcibly lower the post 1' and thereby bring the wheel 4' into engagement with the surface on which the car is standing, and thus jack up the front end of the car in a manner similar to that above described in connection with the other figures. It will be understood that this lowering of the post 1' will cause the beveled lug 26 to move downwardly over the beveled end 27' of the bolt 27 causing said bolt to move inwardly against the tension of its spring, and when said lug passes below said bolt, it will spring forwardly into locking engagement with the upper face of the lug and thereby hold the post in lowered operative position as shown in Fig. 4. When this post has been so lowered, the continued rotation of the driving shaft 13' will operate in the same manner as that above described in connection with the other figures to turn the car with the rear wheels thereof operating as pivots so that the vehicle may be swung around on said wheels within a space substantially equal to the length thereof.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. The combination with a motor vehicle having a driving shaft arranged longitudinally thereof, a clutch member fixed to said driving shaft, a shaft section extending in advance of the driving shaft and in longitudinal alinement therewith, a coöperating clutch member slidably mounted on said shaft section, means for normally holding said sliding clutch member out of engagement with the driving shaft carried member, a vertically movable post carried by the front of said vehicle, a wheel mounted to rotate in a plane transverse to the vehicle, a connection between said wheel and said shaft section whereby the rotation of the latter may be imparted to the former, coöperating means carried by said wheel and said post whereby the rotation of said wheel in one direction will operate to lower the post, and means under the control of the driver for operating the means to cause said post to be lowered and the wheel carried thereby driven to effect the turning of the vehicle.

2. The combination with a motor vehicle having a drive shaft with a clutch member fixed thereto, a shaft section arranged in longitudinal alinement with the front end of said driving shaft, a spring retracted clutch member mounted to slide on said shaft section and to be engaged with the clutch member carried by the driving shaft, a lever under the control of the driver for effecting the engagement of said clutch members, a toothed wheel carried by said shaft section, a vertically movable post mounted in advance of said shaft section and in proximity thereto, said post having teeth for meshing with the teeth of said wheel, a wheel carried by said post to turn in a plane transverse to the vehicle, coöperating locking means adapted to interlock when the post is lowered into operative position for holding it in this position, and a driving connection between said post carried gear and said wheel.

3. The combination with a motor vehicle having a driving shaft with a clutch member at its front end, a shaft section arranged in advance thereof and in longitudinal alinement therewith, a slidable clutch member carried by said shaft section, means under the control of the driver for engaging said clutch members to cause the rotation of said shaft section, a toothed disk carried by said shaft section, a post mounted for vertical movement in the front of said vehicle and having teeth for meshing with the teeth of said disk whereby the turning of said shaft section will operate to raise and lower said post, a wheel carried by said post, a driving connection between said wheel and shaft whereby the post will be lowered and the wheel simultaneously rotated.

In testimony whereof I affix my signature in presence of two witnesses.

JEAN RIVIERE.

Witnesses:
WILLIAM L. FOWLER,
JOHN E. BURCH.